Oct. 12, 1948.　　　　M. T. REGAN　　　　2,451,119

TOWING HITCH

Filed March 11, 1946

Maynard Thomas Regan INVENTOR.

BY Samuel H. Davis

Patented Oct. 12, 1948

2,451,119

UNITED STATES PATENT OFFICE 2,451,119

TOWING HITCH

Maynard Thomas Regan, Lansing, Mich.

Application March 11, 1946, Serial No. 653,485

3 Claims. (Cl. 280—33.05)

This invention relates to towing hitches and is more particularly concerned with a towing hitch capable of being mounted on the rear end of a towing truck, upon which the front end of a truck may be mounted and securely fastened and be readily towed without the need of a driver.

There are various types of towing hitches presently used and these involve extremely large and heavy equipment which is not only difficult to detach but cumbersome to transport when detached. Generally, the driver of the towing truck carries the towing hitch to the source of trucks, attaches the hitch, attaches the truck to be towed and delivers the trucks to their destination. At the destination the driver removes the hitch and again takes it to the source of trucks for another delivery. To be desirable for such use the towing hitch must be capable of easy attachment, and it must be light and substantially small to enable ease of transportation when detached. The hitches which are presently used are not only difficult of attachment and detachment but are large and heavy and are a burden on the driver making such deliveries.

It is an object of this invention to provide a towing hitch which can rapidly and simply be attached and which can rapidly and simply be detached, said hitch being substantially small and light in weight. It is a further object to provide a towing hitch which can substantially readily be moved when detached. It is still a further object to provide a towing hitch whereby a truck can be towed over rough and uneven roads, hills and curves.

I have now found that I am able to provide a towing hitch whereby I am able to avoid the disadvantages above mentioned and am able to accomplish the objects set forth.

Similar numerals refer to similar parts through the several views shown.

Figure 3:
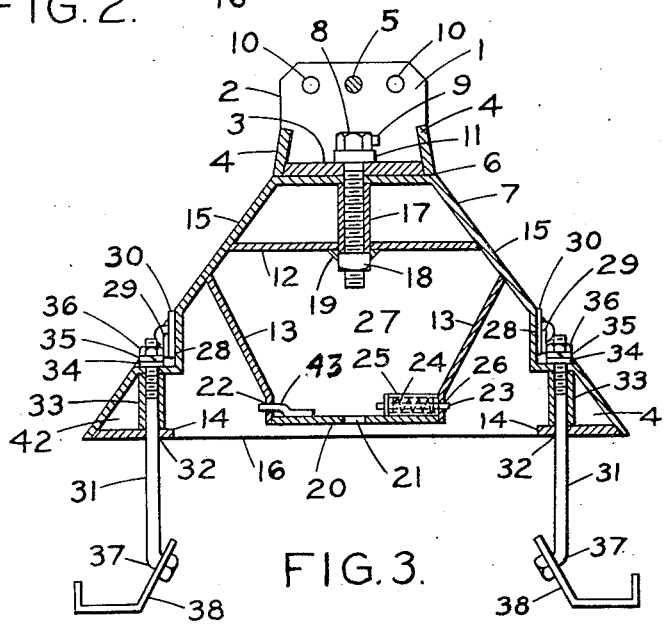
Fig. 3 is a vertical section taken on the line 3—3, Fig. 2.
Figure 4:
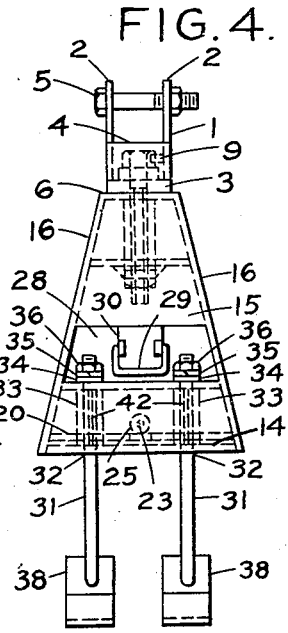
Fig. 4 is an end view of my invention.

Referring now to the drawings for a complete understanding of my invention: In Figures 2, 3, 4, and 5, the saddle 1 is constructed of several parts. The side plates 2, the base plate 3 and the auxiliary plates 4 are substantially reinforced and the side plates 2 are prevented from spreading by bolt 5. The bolt 5 serves also in keeping the front axle of the towed truck securely attached. The side plate 2, the base plate 3, and the auxiliary plate 4 are held in position by welding. The saddle 1 is fastened to the pyramidal box 7 by the swivel bolt 8 and is rotatable thereon. The spur 9 is welded to swivel bolt 8. In Fig. 3 and in Fig. 4, the side plates 1 have two holes 10. The head of bolt 8 rests upon a washer 11. The said box 7 is reinforced by plates 12, 13, and 14, which are welded thereto. The base of plate 14 rests in contact with the plate 16. The plates 16 and 17 are welded to form the box 7. The tube 17 is welded to plate 12 and is shown by weld 19. The plate 20 is provided with a grip hole 21 and the cover plate 20 is substantially held between plates 13 by means of two bars 43, one only of which is shown, and inserted into holes 22, one only of which is shown. The cover plate 20 is closed by bar 23 and by spring 24. The spring 24 is inserted in the cylinder 25 which is welded to cover plate 20. The bar 23 extends through the hole 26 and through the right plate 13. The plates 12, 13, 15, and 16, and cover plate 20 envelope the storage space 27. The plates 15 are provided with right angle notches 28. Carrying handles 29 are fastened by welding to plates 15. The four bolts 31 pass through holes 32 in plates 14 and through reinforcing tubes 33 and are held by nut 36 in notches 28. Washer 34 is a plain washer. The bolts 31 are bent at an angle at 37. The bolts 31 are inserted through clamping plates 38. Gusset brackets are welded to plates 14, plates 15, and the tubes 33.

Figure 1:
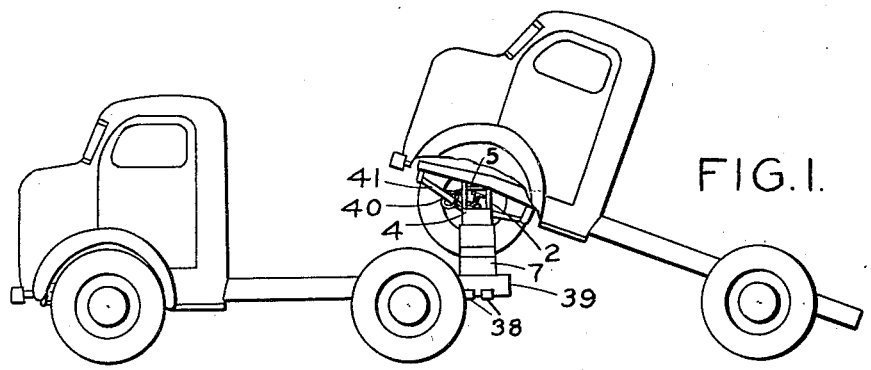
Fig. 1 is an end view of the assembled invention showing the towing hitch attached to the rear of a towing truck, and showing the towed truck mounted, and securely attached to the towing hitch of my invention.
Figure 2:
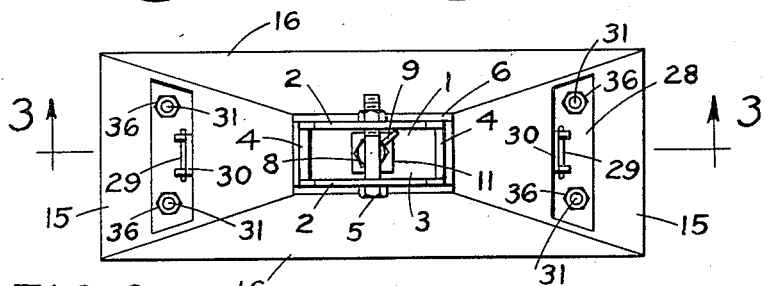
Fig. 2 is a plan view of my invention.

In the practice of my invention the box 7, together with all parts as shown in the drawings is placed on the frame 39 of the towing truck shown in Fig. 1. The clamping plates 38 are placed under the frame 39 and are fastened by the use of bolts 31 and nuts 36 against the underside of frame 39. The plates 14 come in contact with frame 39 as shown in Fig. 3. The frontal portion of the towed truck is raised and the frontal axle is placed on plates 4 of the saddle 1 and situated between plates 2. The bolt 5 is inserted through the holes in the side plates 2 and the nut thereof is screwed on. Chains 40, which are shown only in Fig. 1, are fastened through holes 10 of plate 2 and passed around the frontal end of spring 41. At the destination of the towed truck, the said truck is detached from the tow hitch of my invention and nuts 36 are removed and clamps 38 are unfastened. The box 7 is lifted from the rear end of the towing truck by handles 29. The nut 18 is removed from bolt 8 and the saddle 1 is removed from box 7. The spur 9 prevents the saddle from turning. The cover plate 20 is removed and is turned over and is thereby secured by bolt 8 and by nut 18. All the other parts such as 38, 31, 34, and 36, are removed and placed in the storage space 27 and the cover plate 20 is replaced. The handles 29 provide for a convenient manner of lifting and carrying the tow hitch of my invention.

The tow hitch of my invention above-described involves no difficulties in manufacture, and can be constructed from light-weight materials. It is attached to the towing truck without difficulty; is similarly detached with ease and can easily be transported.

I claim:

1. A vehicle towing hitch comprising a plurality of inclined walls forming the sides of a truncated pyramidal box-shaped support, means on said support for removably attaching the same to a body of a towing vehicle, means pivotally secured to the truncated end of said support for receiving a front axle of a towed vehicle, and additional walls forming with said inclined walls a receptacle, one of said additional walls being removably attached to at least two others of said additional walls.

2. A vehicle towing hitch comprising a support including four inclined side walls integrally joined together to form a truncated pyramid, a top wall integrally connected to the upper extremities of said inclined side walls, a saddle comprising a horizontal web and spaced apart upright front and rear walls, means pivotally connecting said saddle to said top wall solely on a vertical axis passing through said web, and removable means for securing an axle in said saddle, said means being connected to said front and rear walls in spaced relation to said web.

3. A vehicle towing hitch as defined in claim 2 wherein said support is provided with walls in addition to said inclined walls and forming therewith a receptacle, one of said additional walls being removably attached to said support.

MAYNARD THOMAS REGAN.

REFERENCES CITED

The following references are of record in the file of this patent:

UNITED STATES PATENTS

| Number | Name | Date |
|---|---|---|
| 2,152,279 | Randall et al. | Mar. 28, 1939 |
| 2,411,411 | Blair et al. | Nov. 19, 1946 |
| 2,436,485 | Roxy | Feb. 24, 1948 |